GALVANIC CELLS

Jack Davis, Gidea Park, England, assignor to The Ever Ready Company (Great Britain) Limited, London, England, a company of Great Britain
No Drawing. Filed Feb. 10, 1960, Ser. No. 7,751
Claims priority, application Great Britain Feb. 12, 1959
4 Claims. (Cl. 136—107)

This invention relates to improvements in galvanic cells.

Many undesirable effects are brought about in galvanic cells by the presence of foreign trace metal ions, e.g. copper, cobalt or nickel. For example, the shelf life of a cell is seriously reduced by the presence in the cell of several parts per million of such a foreign trace metal, and it is often difficult to detect the presence of these trace metals and impossible to remove them from the cell.

According to the invention, the efficiency of galvanic cells is improved by converting foreign trace metal ions in such a cell into a form in which they are inert with respect to the essential chemical reactions in the cell.

The foreign trace metal ions may be rendered inert by including a mercurous or mercuric compound, e.g. mercuric chloride, into the cell and thereby amalgamating the zinc anode. We prefer, however, to render said ions inert by incorporating a suitable chelating agent in the cell in a proportion at least sufficient to form chelates with all foreign trace metal ions. Preferably the chelating agent is incorporated in bibulous elements of the cell.

The use of such chelating agents may obviate altogether the necessity for including a mercurous or mercuric compound in a dry cell.

In normal practice a quantity of chelating agent in excess of that required to form chelates with the foreign trace metal ions will be incorporated in a cell. If desired a mixture of suitable chelating agents may be incorporated in the cell.

Chelating agents which may be used in accordance with the invention are those based on ethylene diamine tetracetic acid and its salts, though other amino carboxylic acids containing one or a number of amino groups and one or a number of carboxylic acid groups and their salts may also be used. A mercury salt of such an acid may be used as a chelating agent in order to achieve amalgamation of the zinc anode in addition to the chelating action.

Chelating agents possess the property of complexing with most polyvalent metal ions to form chelates, which are generally very soluble in water and contain the metal as part of a ring system in which it has lost its characteristic chemical and ionic properties and so cannot be deposited on a zinc electrode of a galvanic cell, for example, and cause the undesirable effects already mentioned.

In certain cases, chelating agents show a selective action in complexing with some metals in preference to others; the extent to which chelation occurs depends on a number of factors such as the nature and valency of the metal ion to be chelated, the pH value of the electrolyte, the presence of anions and other metals, and the temperature. As a general rule, the higher the valency and the pH value the greater is the tendency for chelation to take place; the transition elements, for example iron, chromium, cobalt and nickel are strongly chelated.

The present invention is especially advantageous for improving the shelf life of galvanic dry cells of the Leclanché type owing to the impurities generally associated with the depolarising mix used in these cells. The chelating agent can be added to the electrolyte, or to the depolarising mix of such cells. The cell may be a round cell comprising a carbon rod, depolarising mix, separator, electrolyte, for example, a paste and zinc container, or may comprise one or more cell units of a layer type battery of the Leclanché type, for example units which comprise a duplex electrode, a separator and cake. In the case of the layer cell, the electrolyte in each unit is segregated by a peripheral sheathing formed of inert stretchable material, such as is described in United Kingdom patent specification No. 536,869.

The invention also provides a galvanic cell which includes a suitable chelating agent, preferably in its bibulous elements, in a proportion at least sufficient to form chelates with all foreign trace metal ions in the cell.

Use of the present invention is particularly advantageous in the manufacture of dry cells as a means of overcoming the effect of impurities, particularly if these impurities consist of heavy metals in a soluble form.

In the following examples two alternative types of chelating agent are utilized, viz.—

(a) A chelating agent identified as chelate A which is NN dihydroxyethylglycine or a salt thereof, and of which a particular example is the material sold under the trade name Detarex HM of formula

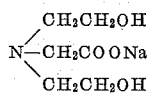

(b) A chelating agent identified as chelate B which is ethylene diamine tetracetic acid or a salt thereof and of which a particular example is the material sold under the trade name Detarex 100 of formula

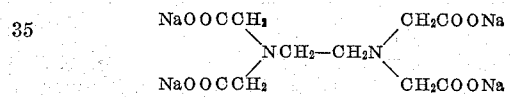

It has been found that in selecting the type of chelating agent due regard should be given to the construction and chemical components of the cell in which the chelating agent is to be used. For example, it has been found that Detarex 100 is effective in layer cells made in accordance with United Kingdom Patent No. 603,927 but is completely unsuitable for incorporation in round cells with a cereal paste electrolyte because of an undesirable increase in internal resistance of the cell on ageing. In the latter type of cell, Detarex HM has been found to be effective.

Example 1

A common round cell of dimensions 1 5/16" diameter x 2 13/32" height might contain up to 0.004 gm. of copper and nickel in the soluble form in the depolarising mix. The theoretical quantity of the mono sodium salt of NN dihydroxyethylglycine required to chelate this quantity of metallic impurity is 0.067 g. To allow a margin, double this amount is added, viz. 0.134 g.

If a 50% w./v. aqueous solution is used, this would be 0.27 mls./cell.

The 50% w./v. aqueous solution may be added to the water during some stage in the manufacture of the paste electrolyte.

Example 2

In the manufacture of a layer type cell, in particular a cell such as is described in patent specification No. 536,869, the requisite amount of chelate B is incorporated in the separator of the cell.

Example 3

This example shows how the factory testing of cells and batteries is facilitated and the percentage of reject cells and batteries reduced by the incorporation of a chelating agent in the cell, due to the resultant elimination of variation in open circuit voltage otherwise arising from the presence of varying amounts of contaminating metals at varying distances from the zinc anode.

Two groups of batteries were subjected to an open circuit voltage test. One group was standard and the other group contained a sufficient quantity of Detarex HM to render foreign trace metal ions inert. It was found that the open circuit voltage readings obtained from the standard group fluctuated widely so that in practice, an undesirable proportion would have been rejected as substandard. With one exception all the batteries of the group incorporating Detarex HM gave identical open circuit voltage readings, the remaining battery showing 0.4 volt below the rest. On examination, the single defective battery was found to have a mechanical fault in one cell.

The following two examples illustrate the improvement in shelf life achieved by the invention.

*Example 4*

A series of tests was made with 22½ volt layer batteries including additions of copper and nickel (total of copper and nickel 0.5 mgm. per cell) and chelate B. The cell size was the F40 and the discharge test was through 150 ohms per cell, two hours daily to an end point of 0.75 volt per cell. The batteries were discharged new and after 6 months storage and the results in comparison with the normal standard product were as follows:

|  | Output Hours | |
|---|---|---|
|  | New | 6 months |
| Standard | 70.8 | 69.9 |
| +added Cu, Ni | 54.0 | 17.1 |
| +Chelate B | 69.3 | 66.8 |
| +Chelate B and added Cu, Ni | 67.1 | 66.8 |

*Example 5*

A similar series of tests using chelate A was conducted with 90 volt H.T. batteries having 60 round cells in series which confirmed the conclusion to be drawn from Example 4.

By means of the present invention, the harmful effect of the presence of metallic impurities in a galvanic dry cell is virtually eliminated.

In carrying out the invention various modifications may be made within the spirit of the invention for example in a round cell employing a cereal paste electrolyte the chelating agent may be Detarex HM and with a round cell employing a methyl cellulose film electrolyte carrier according to United Kingdom Patent No. 603,927 the chelating agent may be Detarex 100.

I claim:

1. A method of improving the efficiency of a primary galvanic cell of the kind comprising a zinc electrode and depolarising mix including manganese dioxide, which method comprises incorporating in the cell a chelating agent selected from the group consisting of amino carboxylic acids and their derivatives in a proportion at least chemically equivalent to foreign trace metal ions selected from the group consisting of copper, nickel, lead and cobalt ions, introduced into the cell as trace impurities in the manganese dioxide depolariser, whereby said foreign trace metal ions are incorporated in the chelate rings and are thereby rendered inert with respect to the essential chemical reactions in the cell.

2. A primary galvanic cell of the kind comprising a zinc electrode and a depolarising mix including manganese dioxide, including a chelating agent selected from the group consisting of amino carboxylic acids and their derivatives, the chelating agent being present in a proportion at least chemically equivalent to foreign trace metal ions selected from the group consisting of copper, nickel, lead and cobalt ions introduced into the cell as trace impurities in the manganese dioxide depolariser.

3. A cell according to claim 2 in which the chelating agent is a mercury salt of dihydroxyethylglycine.

4. A cell according to claim 2 in which the chelating agent is a mercury salt of ethylene diamine tetracetic acid.

References Cited in the file of this patent

UNITED STATES PATENTS

| 1,749,665 | Diltz | Mar. 4, 1930 |
| 2,343,194 | Lawson | Feb. 29, 1944 |
| 2,433,024 | Burgess | Dec. 23, 1947 |
| 2,829,189 | Coleman et al. | Apr. 1, 1958 |

FOREIGN PATENTS

| 14,725 | Australia | May 23, 1934 |

OTHER REFERENCES

"Sequestrene," Alrose Chemical Co., Providence, R.I., July 25, 1952, page 28.

"Versenes," Bersworth Chemical Co., Framingham, Mass., February 1952, pp. 46–48 (Sect. 2).